T. E. C. Brinly,

Cotton Sweep.

No. 109,491.   Patented Nov. 22, 1870.

Witnesses.

T. E. C. Brinly
Inventor.
D. P. Holloway & Co.
Atty

UNITED STATES PATENT OFFICE.

THOMAS E. C. BRINLY, OF LOUISVILLE, KENTUCKY.

IMPROVEMENT IN COTTON-SWEEPS.

Specification forming part of Letters Patent No. 109,491, dated November 22, 1870.

*To all whom it may concern:*

Be it known that I, THOMAS E. C. BRINLY, of Louisville, in the county of Jefferson, and in the State of Kentucky, have invented a new and useful Improvement in Cotton-Sweeps; and I do hereby declare that the following is a full, clear, and exact description of the same, reference being had to the annexed drawings, making a part of this specification, in which—

Figure 1:
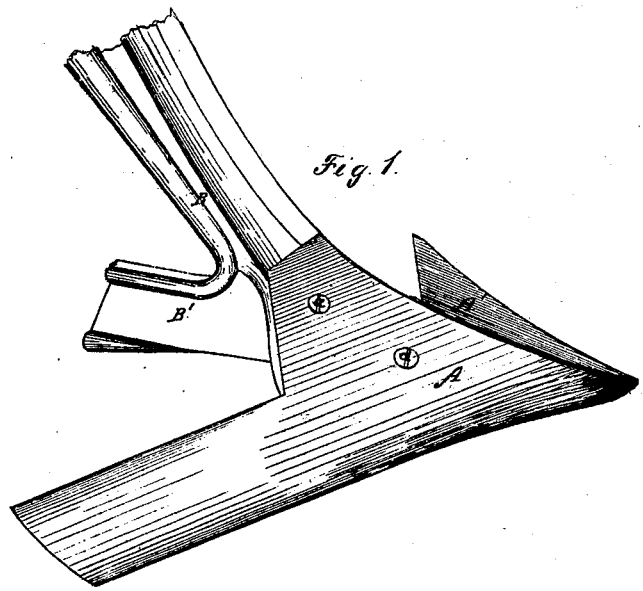
Figure 2:
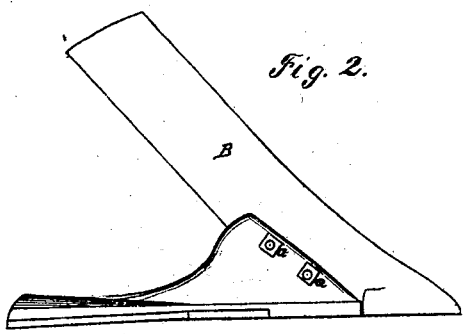
Figure 3:
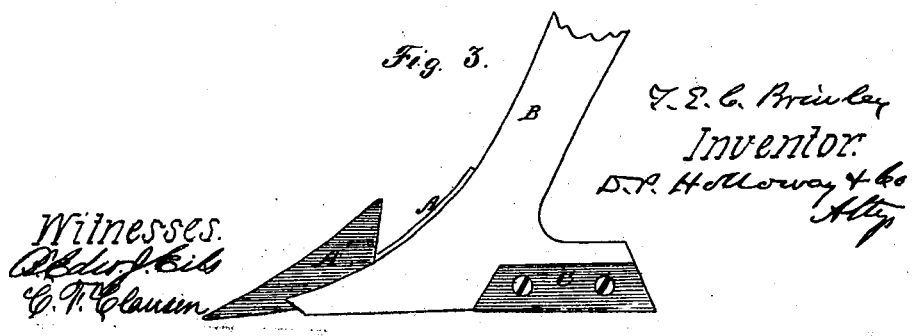

Figure 1 is a perspective view of my improved sweep or cultivator, showing the helve or standard for attaching it to the beam, the projecting arm, and cutter attached thereto. Fig. 2 is a bottom view, showing the method of attaching the sweep or shoe to the share and helve. Fig. 3 is a side elevation, showing the cutter upon the share, the helve, and the hardened metal upon the heel thereof.

Corresponding letters refer to corresponding parts in the several figures.

Cotton-sweeps as heretofore constructed have been found to be very objectionable from the fact that no adequate provision has been made for cutting down or removing the weeds and grass which grow in close proximity to the plants, and without disturbing such plants.

The object of this invention is to provide a sweep which may be run so close to the plants to be cultivated as to cut away any and all kinds of vegetation which may choke or hinder the growth of such plants as it may be desirable to cultivate without in the least disturbing them; and to this end it consists in providing the single-armed shoe of a sweep with a vertical cutter, such share being arranged upon a standard constructed with a landside, in such a manner that its inner surface, or that surface which, when in use, is nearest the growing crop, will be flush with the landside, in order that it may be run close to the plants, and thus produce the effect above described.

A in the drawings refers to what may be termed the "share" of the sweep. It is constructed substantially as shown in Fig. 1 of the drawings, its broadest part being curved so as to fit the standard to which it is attached, and to give the proper direction to the earth which may rise upon it. The rear portion of the share is cut away, as shown in the figure referred to, so as to leave a projecting arm, which is also slightly curved, its lower edge being about on a line with the lower surface of the landside and being sharpened, so as to more readily cut the roots of the weeds or grass with which it comes in contact. Upon the upper surface of the share, and near its point, there is attached a cutter, A', which rises vertically, or nearly so, and extends backward for, say, four inches, (more or less,) gradually increasing in height from its point to its rear termination. The upper edge of the cutter is reduced in thickness, so as to form an edge sufficiently sharp to cut the weeds and grass away from the plants, as above described.

B refers to the helve or standard, to which the share is secured by bolts and nuts *a a*, so as to be readily removed. This standard may be cast, and of the form shown in the drawings, or it may be of wrought-iron and of any suitable form to which to attach the share and the beam.

C refers to a piece of hard metal, which, when the standard and landside are made of cast-iron, is to be let into the rear end thereof, as shown in Fig. 3, the office of which is to prevent the wearing away of the metal at that point. This piece may be made of cast-iron and chilled, or it may be of steel and hardened.

Having thus described my invention, what I claim, and desire to secure by Letters Patent, is—

The share A, constructed in one piece with the cutter A', in combination with the standard B, constructed in one piece with the landside B', and arranged in relation to one another substantially as set forth.

In testimony whereof I have signed my name to this specification in the presence of two subscribing witnesses.

T. E. C. BRINLY.

Witnesses:
FRANK HAMMOND,
JAMES M. WELLS.